US005300772A

United States Patent [19]

Buttrill, Jr.

[11] Patent Number: 5,300,772

[45] Date of Patent: Apr. 5, 1994

[54] QUADRUPLE ION TRAP METHOD HAVING IMPROVED SENSITIVITY

[75] Inventor: Sidney E. Buttrill, Jr., Palo Alto, Calif.

[73] Assignee: Varian Associates, Inc., Palo Alto, Calif.

[21] Appl. No.: 923,093

[22] Filed: Jul. 31, 1992

[51] Int. Cl.$^5$ ........................ B01D 59/44; H01J 49/40

[52] U.S. Cl. ........................................ 250/282; 250/292

[58] Field of Search ........................ 250/282, 281, 292

[56] References Cited

U.S. PATENT DOCUMENTS

| | | | |
|---|---|---|---|
| 4,540,884 | 9/1985 | Stafford et al. | 250/282 |
| 4,749,860 | 6/1988 | Kelley et al. | 250/282 |
| 4,761,545 | 8/1988 | Marshall et al. | 250/291 |
| 4,882,484 | 11/1989 | Franzen et al. | 250/282 |
| 5,075,547 | 12/1991 | Johnson et al. | 250/282 |
| 5,089,703 | 2/1992 | Schoen et al. | 250/282 |
| 5,171,991 | 12/1992 | Johnson et al. | 250/282 |
| 5,173,604 | 12/1992 | Kelley | 250/282 |

FOREIGN PATENT DOCUMENTS 0362432 4/1990 European Pat. Off. .

OTHER PUBLICATIONS

McLuckey, Scott A. "Selective Ion Isolation/Rejection Over A Broad Mass Range in the Quadrupole Ion Trap," *J. Am. Soc. Mass Spectromet.*, 1991, vol. 2, pp. 11-21.

*Primary Examiner*—Bruce C. Anderson

*Attorney, Agent, or Firm*—Gerald M. Fisher; Edward H. Berkowitz

[57] ABSTRACT

A method for improving sensivity of a QIT by overcoming deleterious space charge effects on the collection of higher mass ions in a QIT by rejecting residual air gas ions during ionization and by rejecting other ions during ionization employing a 1/m/z weighting of the amplitude of each secular frequency, where m/z is the mass to charge ratio of the ions.

12 Claims, 5 Drawing Sheets

QUADRUPLE ION TRAP METHOD HAVING IMPROVED SENSITIVITY

FIELD OF THE INVENTION

This invention relates to a method for improving collection sensitivity and isolation of ions of interest in a quadrupole ion trap mass spectrometer.

BACKGROUND OF THE INVENTION

Mass spectrometers are devices for making precise determinations of the constituents of a material by providing separations of all the different masses in a sample according to their mass to charge ratio. The material to be analyzed is first disassociated/fragmented into charged atoms or molecularly bound groups of atoms, i.e. ions.

There are several distinct types of mass spectrometers. The quadrupole mass spectrometer is a relatively recent apparatus which was first described in a paper by Paul, et al. in 1952. The quadrupole mass spectrometer differs from earlier spectrometers because it does not require use of large magnets but employs radio frequency fields in conjunction with a specifically shaped electrode structure. In this structure, RF fields can be shaped so that they interact with ions so that the resultant force on certain ions is a restoring force so that the ions are caused to oscillate about a neutral position.

In the quadrupole mass spectrometer (QMS), four, long, parallel electrodes, each having precise hyperbolic cross sections, are connected together electrically. DC voltage, U, and RF voltage, $V_o$ cos Wt can be applied to the electrodes. In the QMS, restoration forces act on the ions in two directions only, so the trapped ions travel with a constant velocity down the axis as they oscillate around the axis.

Another closely related device also disclosed in the Paul, et al., paper has become known as the quadrupole ion trap (QIT). The QIT is capable of providing restoring forces to the ion in all three directions and can actually trap ions of selected mass/charge ratio. The ions so trapped are capable of being retained for relatively long periods of time which supports separation of selected masses and important scientific experiments and industrial testing which is not as convenient to accomplish in other spectrometers.

Only in very recent years has the QIT become of increased importance as a result of the development of relatively convenient techniques for ionizing, trapping, isolating and separating trapped ions. Ionization is usually by electron bombardment. By adjusting the QIT parameters so that it stores only a selectable range of ions from the sample within the QIT, and then linearly changing, i.e. scanning one of the QIT parameters, it is possible to cause consecutive values of mass/charge (m/z) of the stored ions to become successively unstable. This is called the instability scanning mode, as disclosed in U.S. Pat. No. 4,540,884. The mass spectrum of the trapped ions is obtained by sensing the intensity of the unstable ions which provide a detected ion current signal as a function of the scan parameter.

The QIT has also become very useful in a new mass spectrometer technique known as MS/MS where a selected ion is retained in the QIT and all the other trapped ions are ejected; then the remaining ion or ions (parent) are disassociated and the fragments (daughter ions) are scanned out of the trap to obtain the mass spectrum of the daughter ions.

The MS/MS technique requires improved ion isolation. Isolation techniques have been improved by use of so called "supplementary generators" to assist in the selective isolation of particular ions by resonantly ejecting unwanted ions. U.S. Pat. No. 4,749,860 employs such a supplemental generator RF field which is connected across the QIT end caps and provides an excitation frequency which corresponds to the so called "secular frequency" of an ion which is to be ejected. For example, to isolate an ion m(p), the supplemental frequency can be selected, for a particular RF trapping voltage, to be equal to the secular frequency of the next closest trapped ion having m/z ratio of m(p)+1. The supplemental voltage is applied to the end caps of the trap simultaneously with the scanning of the voltage of the trapping field. This approach suffers from at least three problems. First, mass instability scanning to eject ions of mass less than m(p) suffers from poor mass resolution and thus results in significant loss in the intensity of the m(p) ion while attempting to completely remove the m(p)−1 ion out of the stability region. Second, the stability boundary on the high side is flat so that this procedure also suffers significant loss of the m(p) ion when trying to eliminate the m(p)+1 ion. Finally, it is essential to know the precise value of the voltage of the RF trapping field. To calculate the precise secular frequency, it is probably impossible to know the exact voltage acting on the ions because of the mechanical or electrical (electrode) imperfections and because of space charge effects which act to shift the stability region significantly. The so called space charge effect is known to significantly effect the secular frequency. The equation which defines the secular frequency is $$W = \beta_z\left(\frac{W_o}{2}\right)$$

where $W_o$ is the RF trapping field frequency and W is the secular frequency at any value of $\beta_z$. It has become the practice to apply the supplemental frequency to eject the higher m(p)+1 ions at low values of $\beta_z$ because the relationship between $\beta_z$ and the other stability parameters outside this region is non-linear and the resolution at usual scan speed is poor. Also, at lower RF trapping field voltage, the average ion energy is lower and ions can be created and retained in the trap more efficiently, other parameters being equal. Furthermore, there is a limit to the maximum mass which can be ejected by this technique unless the value of the RF field is increased. The '860 patent, to eject the higher masses, adds the additional step of frequency scanning the supplemental frequency down to low frequencies which requires complex equipment and introduces undesirable additional isolation process steps.

It is known to employ broadband supplemental waveform generators such as a Fourier Transform (FT) synthesizer to create a time domain excitation based on a spectrum of desired excitation frequencies to cause tailored ejection of specific bands or ranges of ions. As pointed out in U.S. Pat. No. 4,761,545, the FT synthesizer technique employs very high power amplifiers. Also, even when phase scramblers are used with FT, it is not possible to achieve arbitrary excitation frequency spectrum at suitable low peak excitation voltages because of so called Gibbs oscillations.

It is also known from European Patent Application, EPO 362432A1, to shorten the process scan time in a QIT by simultaneously eliminating uninteresting ions at the same time off their creation. The express reason for the procedure is stated in this EPO patent, at Col. 4, line 7, "The advantage of this method is the shorter time needed to eliminate the unwanted ions as compared to . . . alternate steps . . . ".

The McLuckey paper, *J. Am. Soc. Mass Spectrometer*, 1991, V. 2, p. 11-21 recognizes that situations can occur where desired ion accumulation cannot occur due to rapid buildup of matrix ions, and that matrix ion ejection might be most useful when applied during ion accumulation. Although McLuckey noted empirically seeing discrimination effects of space charge in situations of widely different m/z values, he did not disclose or identify the relationship between space charge and stored mass or the significance of the effects of common environmental air gases on the accumulation of high m ions.

SUMMARY OF THE INVENTION

It is an object of this invention to employ the inverse mass relationship of the QIT restoring force in a method for more efficient storage and more efficient ejection of ions.

It is an object of this invention to provide an improved method to increase selective QIT ion storage in order to improve sensitivity and ion isolation.

It is a still further object of this invention to reduce the power required for selective supplemental tailored waveform ion ejection.

It is a feature of this invention to reduce the stress and wear on the ion multiplier detector of the QIT.

It is a further feature of this invention that it enables selective storage of multiple non-contiguous mass regions of interest.

DETAILED DESCRIPTION OF THE INVENTION

Figure 1:
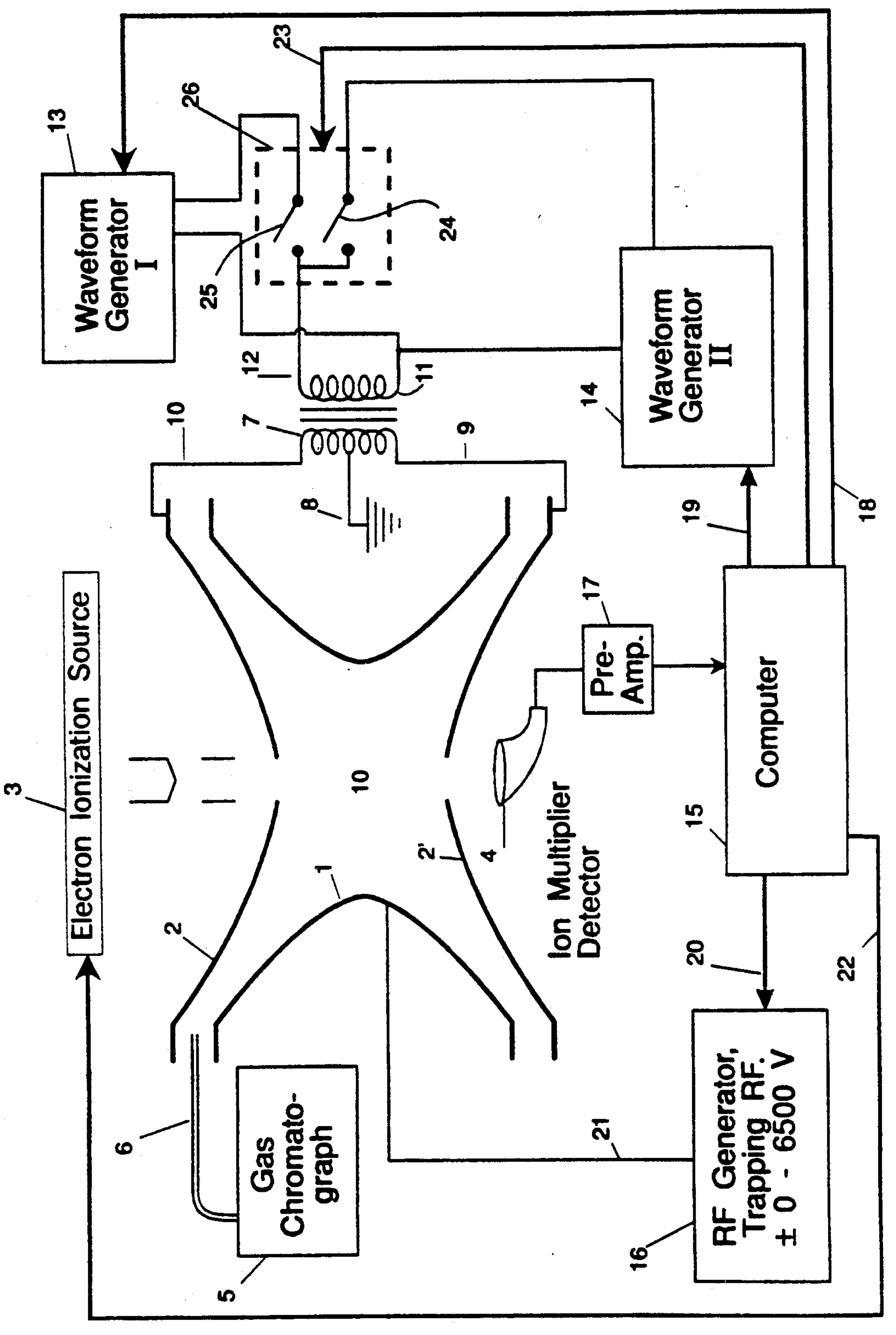
FIG. 1 is a block diagram of a QIT used in connection with the inventive method.

It is known that the application of supplemental frequencies to the end caps of a QIT will render specific ions unstable. It is also known to employ this technique to assist in isolating specific mass ions or mass ranges of ions after they have been injected into and/or ionized and trapped. McLuckey has recognized that the efficiency in which a QIT collects ions is affected by the number of ions already trapped and that some type of mass discrimination was resulting.

I have discovered that the number of ions which may be efficiently trapped and stored during normal operation of these systems is limited if a large number of ions formed from the background environmental air gases remain within the vacuum enclosure. The presence of a high concentration of air gas ions usually results in a large space charge in the QIT which tends to reject other ions which may otherwise have been trapped.

We have determined that the space charge in the QIT effects a discrimination which follows an inverse mass relationship. Specifically, the restoring force is inversely proportional to the ion mass so that higher mass ions are less strongly confined within the trap and more easily discriminated by the build up of a space charge. I have also determined that high ratio m/z ions are more readily ejected when significant numbers of the air gas ions are trapped.

In the usual case for wide range ion collection, RF trapping voltage is set at a voltage which will eject ions less than $m/z=20$. This causes normal carrier gases to be ejected. However, residual environmental air gases are still trapped. We have shown that if we eject these unwanted air gas ions from the trap while they are being formed that we can very significantly increase the efficiency at which we are able to trap other ions, and especially higher mass ions. We have shown a factor of 20 improvement in sensitivity in the collection of ions. This results in lowering of the minimum discernable signal (MDS) level of the QIT spectrometer and in a reduction of the amount of a sample which needs to be employed in tests. Residual gas for these purposes means any gas remaining after vacuum pumping. Typically, this includes the air gases $O_2$, $N_2$, Ar, Ne, $CO_2$ but frequently will include contaminants generated by the vacuum system.

I also apply our new understanding of the relationship of the mass of the ion to trapping efficiency of a QIT to improve the mass isolation process of any selected ions. We have determined that we can greatly decrease the amount of power required for isolation ejection of higher mass ions because of the fact that larger m/z ions are less strongly bound by the trap than ions of lower m/z ratio.

Heretofore, as illustrated by U.S. Pat. No. 4,761,545, bands of frequencies are selected for ejection and the amplitudes of each of the applied frequencies in the bands selected for ejection were arbitrarily made equal to eject unwanted ions. This equal power requirement for each of the secular frequencies in a band requires equipment capable of handling a large amount of power. I have determined that this high power capability is not necessary since the higher m/z ions do not require as much power to be ejected and because it is unnecessary to provide complete bands of frequencies. I employ an algorithm to calculate and set the amplitude of the secular frequency of each undesired ion to be proportional to the inverse of the ion m/z ratio.

With reference to FIG. 1, a QIT is schematically illustrated. The RF trapping generator 16, i.e. on the order of 1.05 MHz is scanable in voltage from 0 to 6500 volts. The RF trapping generator is connected to the ring electrode 1. Both the ring electrode 1 and the cap electrodes 2 and 2' are hyperbolic conductors which establish therebetween a specifically shaped RF field which can provide a three dimensional restoring force to ions of specific m/z ratio according to known equations.

Samples to be analyzed can be introduced via a tube 6, which is illustrated as coming from a gas chromatography apparatus 5, although the sample could originate from any source. Connected across the end caps 2, 2' is a grounded 8, center tapped secondary coil 7 of a transformer. The primary coil 12 of the transformer is coupled through switch 25 in switch box 26 to a Waveform Generator I 13, and through switch 24 to Waveform Generator II, 14. Switch box 26 is controlled via line 23 from computer 15. The interior space of the trap 10 is maintained at vacuum pressures by coupling to a vacuum pump not shown. Electrons from the electron ionization source 3 are caused, under control of computer 15 via connector 22, to violently impact the gases in the space 10 and to fragment the gases into ions, neutrals and groups of charged particles. As shall be described, the computer 15 controls the RF Generator 16 via connector 20 and the Waveform Generator I, 13, and Waveform Generator II, 14. Ions being studied are collected by ion multiplier detector 4 after they become unstable during the scanning of the RF trapping voltage. The detector provides data via preamp 17 to the computer 15 for generation of the spectra of the ions being studied.

According to my invention, Waveform Generator I provides an output which contains many frequencies and includes frequency components which coincide with the secular frequency for rendering unstable the air ions at m/z=28, and 32 as well as the secular frequencies for other selected unwanted ions. The frequencies are determined according to the equation for the secular frequencies, $W=\beta_Z W_o/2$.

Figure 6:
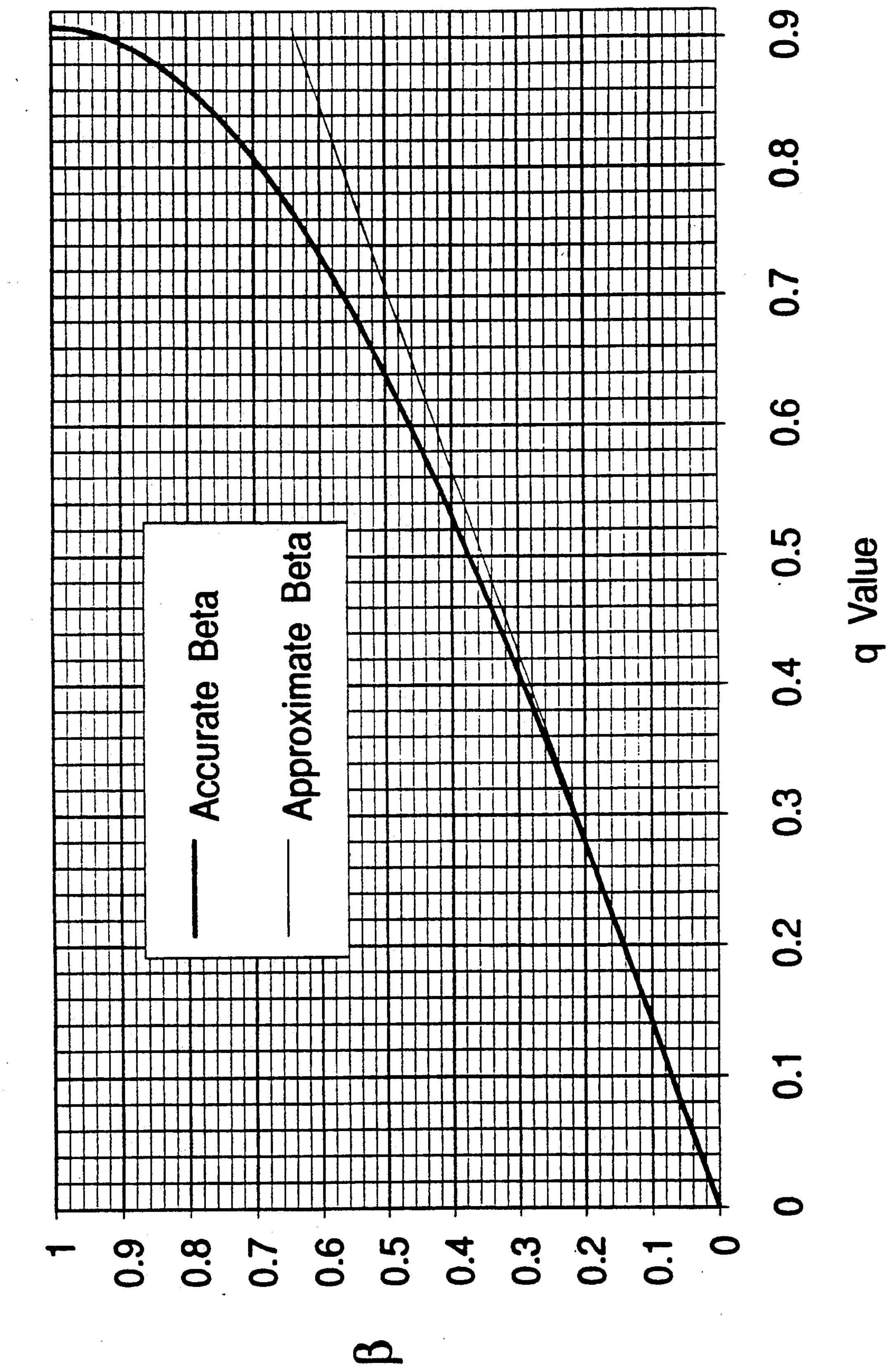
FIG. 6 is a plot of $\beta_z$ versus $q_z$ according to our calculations.

The values of $\beta_Z$ can be calculated accurately using the method suggested in equations 20.3.13 and 20.3.14 according to the method in 20.3.14 of Abromowitz and Stegun, *Handbook of Mathematical Functions*, Dover Publications, Inc., 1965, Pg. 728. The calculated values are shown plotted in FIG. 6.

Also, the equation relating m/z to $q_z$ for the QIT is:

$$q_z = \frac{-4eV}{r_o^2 W_o^2 m}$$

where e is the fundamental charge, $r_o$ is the radius of the ring electrode, V is the amplitude of the RF trapping voltage with angular frequency W.

Accordingly, $$q_z = \frac{kV}{m},$$

where k is a constant determined by the characteristics of the particular QIT mass spectrometer.

Using these equations, the secular frequencies, W, for the air gases are shown in Table I.

TABLE I

| m/z | 28 | 32 |
|---|---|---|
| W, KHz | 273.4 | 231.8 |

Figure 2:
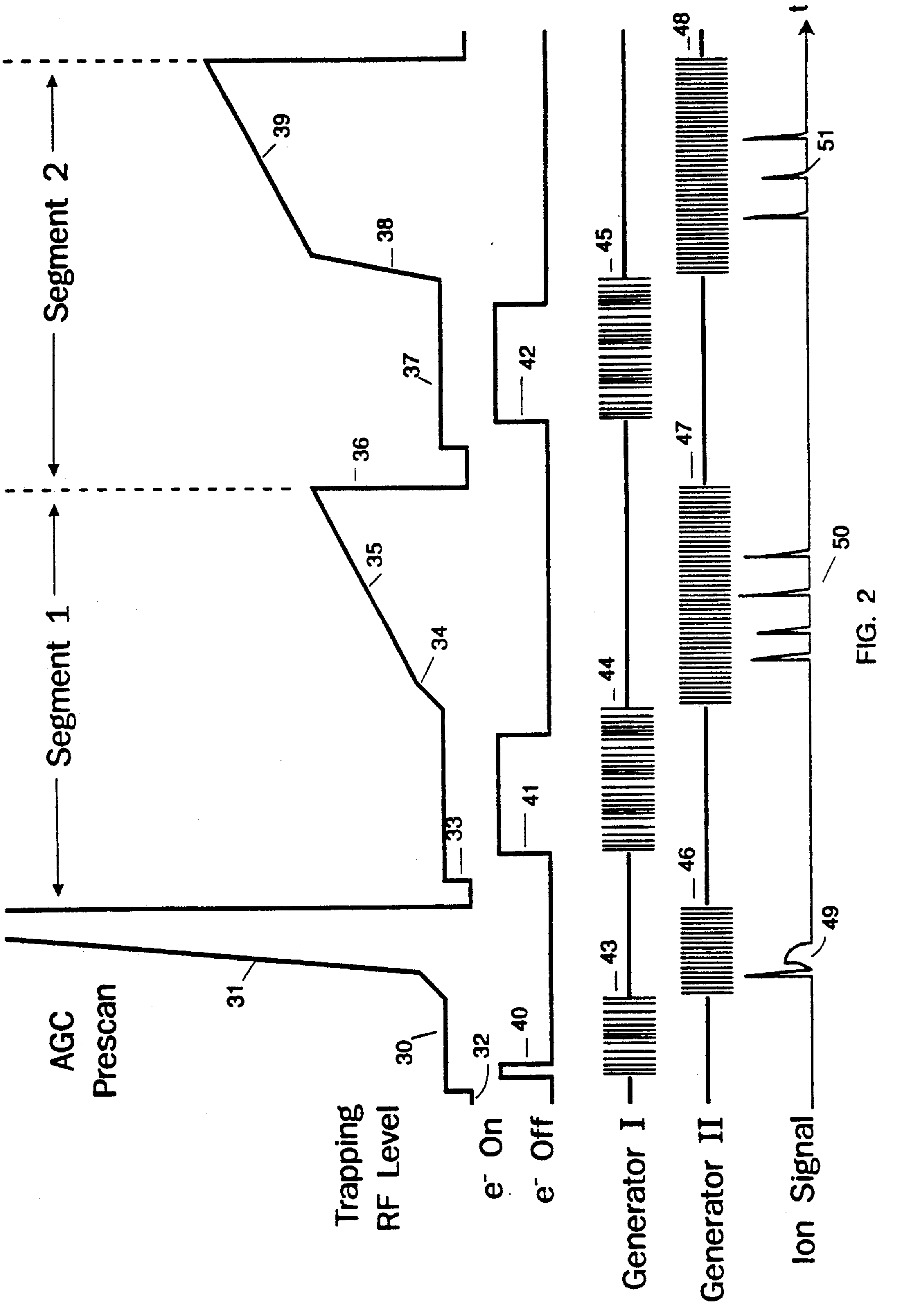
FIG. 2 is a timing diagram for the inventive process.

With respect to FIG. 2, the timing diagram shows that Generator I, at 43, 44 and 45, is switched on and is exciting the QIT end caps during the time that the ionizing e-beam is on at 40, 41 and 42 and for a short cool-down period after the e-beam is switched off. The output waveform of Generator I is the simultaneous addition of the secular frequencies listed in Table I to reject those air gases and the other frequencies for ejecting selected ions for isolation purposes. The phases of all these frequencies should not be equal, and they can be randomly selected or otherwise related. The amplitudes of the air gas ions can be selected to be equal or to follow 1/m relationship for the air gas ions because at these low m/z ratios their m/z values are so close, the inverse mass restoring force relationship is not significant.

Figure 3:
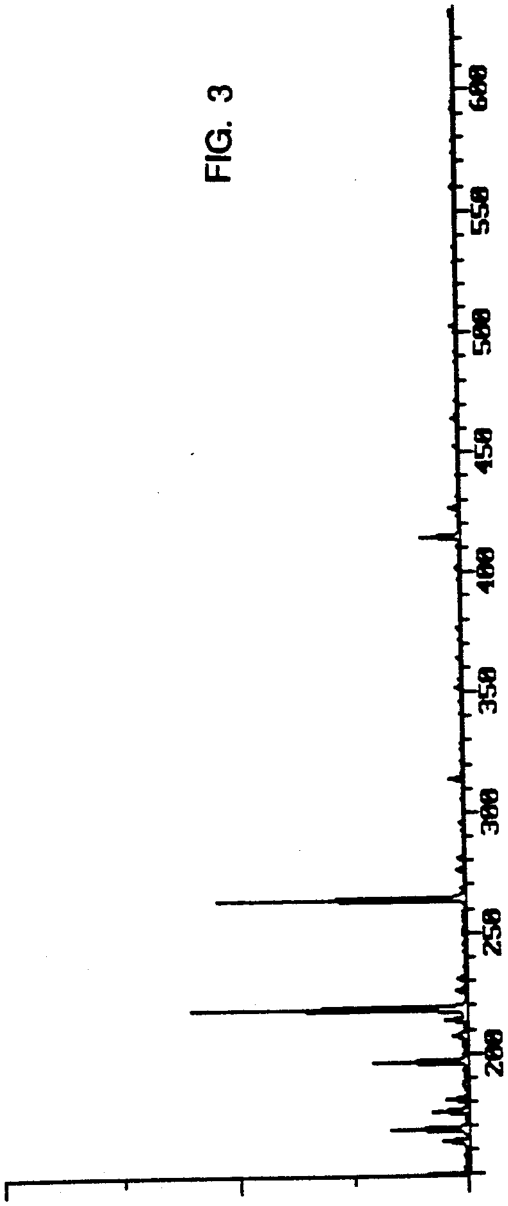
FIG. 3 is a spectra obtained in our QIT with a PFTBA sample without air gas ejection during ionization.
Figure 4:
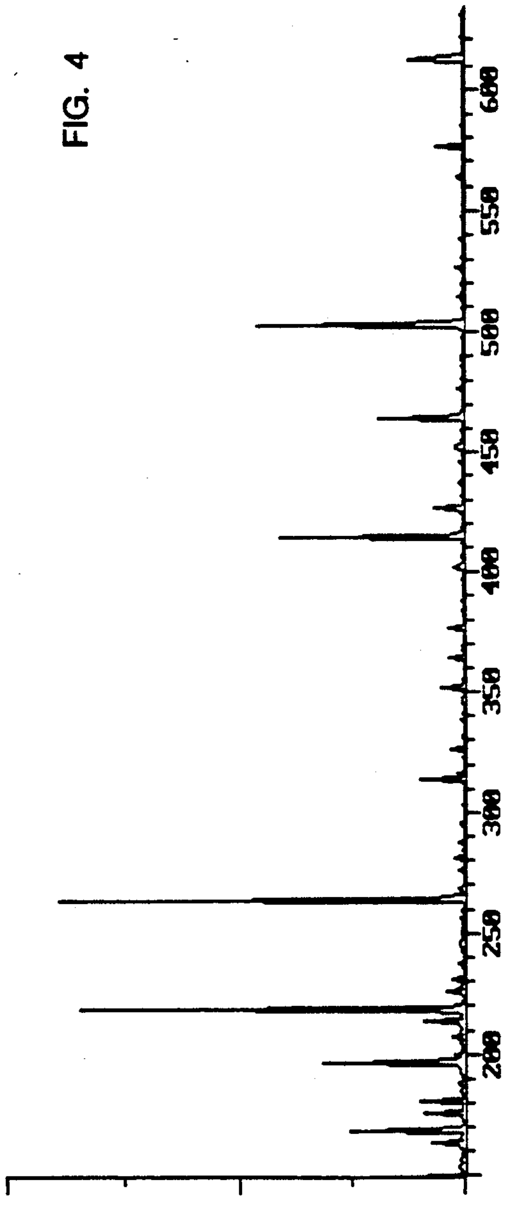
FIG. 4 is a spectra of PFTB with the same parameters as in FIG. 3 with the air gas ejection of our invention.

FIG. 3 is a PFTBA spectrum recorded for my QIT under normal operating conditions for PFTBA with no ejection of low mass ions derived from environmental air gases. FIG. 4 shows the PFTBA spectrum recorded with the supplemental waveform applied to eject ions m/z 28 and 32 during e-beam bombardment. The effect of ejecting the air gases can be seen to be much more significant at the higher masses. Heretofore, the higher masses, i.e., above 300, had not been trapped efficiently during electron bombardment because of the space charge of the large number of lighter air gas ions.

It is known that by raising the level of the RF trapping voltage the stability diagram can be moved such that m/z ratios below 32 could be above $q_z=0.908$ and hence all such ions would be unstable. There are at least two problems with this approach.

First, average electron energy in the trap during ionization is a function of the storage RF voltage. At the level necessary to render m/z $\leqq$32 unstable, the average electron energy would be about 160 ev. This energy level is not close enough to compare with the standard value of 70 ev. used to obtain classic electron impact ionization mass spectra. The fragmentation patterns would differ for many compounds from those in the standard mass spectral libraries. Second, if the voltage were set to render m/z$\leqq$32 unstable, in view of various effects, the point of instability is not sharp and some of the important ions at m/z=35 would be lost as well. Even in view of the above, for heavy ions of primary interest, better resolution and selective storage is obtained by raising the RF trapping voltage for the initial ionization.

Figure 5:
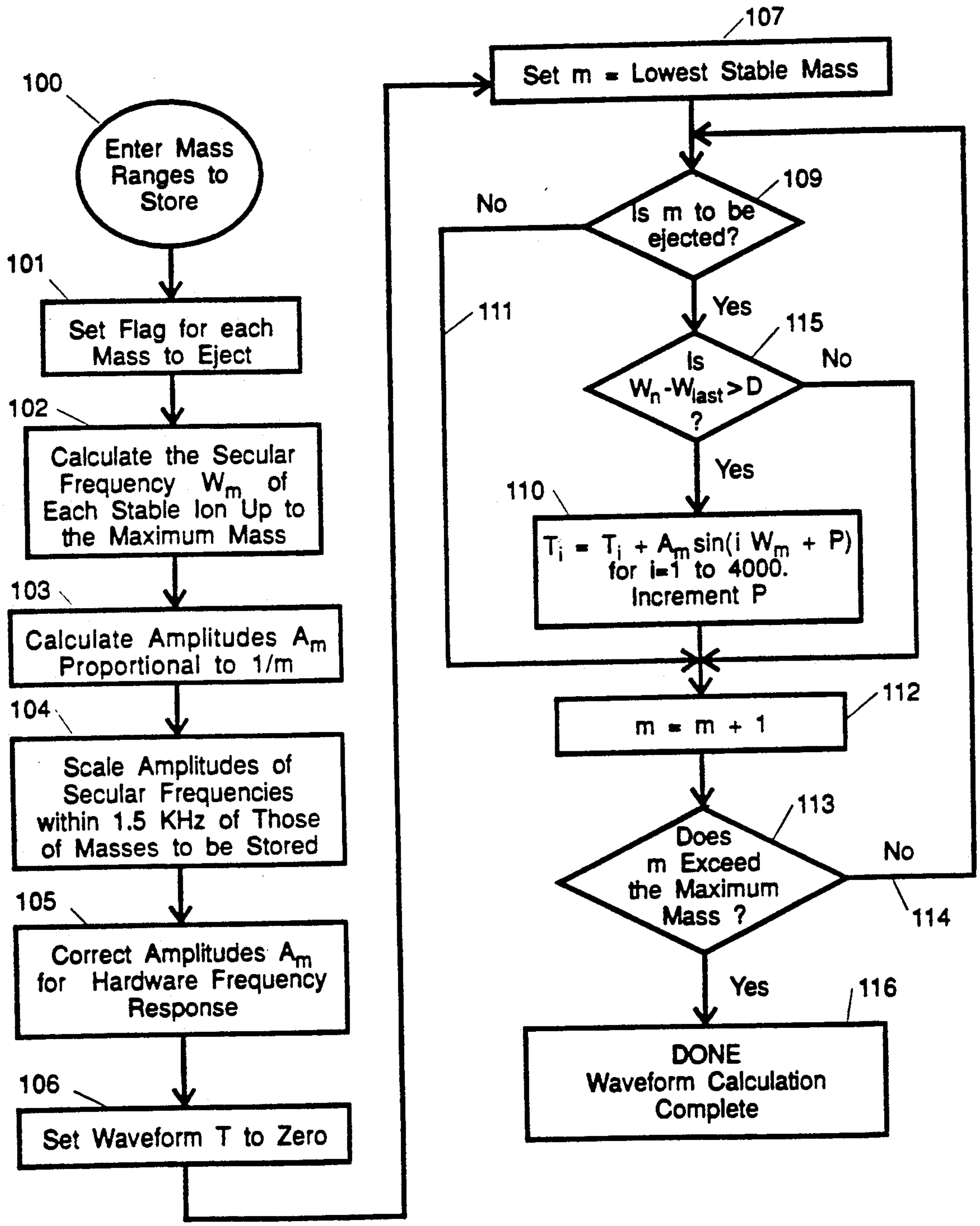
FIG. 5 is a flow diagram of the program for creating the waveform for the Supplemental Waveform Generator II of this invention.

The other aspect of my invention also derives from my appreciation of the effect of the inverse mass/restoring force relationship in the QIT. In the prior art, after an ion range has been selectively isolated in a QIT, it is known to produce a supplemental end cap waveform tailored to simultaneously resonantly eject different ions from the QIT by employing a synthesized FT transform, such as U.S. Pat. No. 4,761,545 or other broadband technique, such as U.S. Pat. No. 4,945,234, to provide the required secular frequencies. None of these prior art techniques heretofore recognized that the higher mass ions can be readily ejected with less power than necessary to eject lower masses. With out approach, the operator selects the masses to be ejected, and the flow diagram of FIG. 5 is employed to generate the complete waveform for Waveform Generator 13 including the environmental air gas secular frequencies. Computer 15 also includes a program sequence generator to provide timing control to Waveform Generator I and II via lines 18 and 19 respectively under the control of switch 26. The Computer 15 also provided the scanning voltage control on line 20 for controlling the RF Generator trapping voltage and the switching on and off of the electron ionization source via line 22. The computer 15 includes a standard microprocessor, not shown, for providing digital values to a standard digital-to-analog-converter (DAC) in Waveform Generator I. The hardware and software for transferring the digital values is available from Quatech Corporation, Akron, Ohio. The hardware is identified as the WSB-100 10 MHz Board with the WSB-A12 Analog module.

With reference to FIG. 2, the supplemental voltage from Waveform Generator II at 46, 47 and 48 is applied to the end caps during the scanning intervals 34, 35, 38 and 39 respectively. Waveform Generator II is not part of my invention. It is set at a fixed frequency of approximately equal to $0.92W_o$. For clarity, the embodiment of FIG. 1, shows the use of two RF generator sources. Since the excitation from the two generators is applied at different instances of time, it is within the capability of RF Generator I to provide both waveforms and to eliminate the switch 26 and RF Generator II.

FIG. 2, also illustrates the previously known automatic gain control (AGC) sequence. To increase the dynamic range of the ion trap, the AGC enables adjustment of the duration of the flux of ionizing electrons. This is accomplished during the high RF voltage scan 31 following the first short ionization pulse 40. Based on the detected AGC signal, 49, the pulse width 41 of the ionization pulse is determined by computer 15 to maximize sensitivity.

The flow diagram of the program employed to create the waveform of Waveform Generator I is shown in FIG. 5. The actual program in FORTRAN is provided in microfiche as an unpublished addendum to this application and is available in the file wrapper of this patent in accordance with 37 CFR 1.96.

Based on a predetermined low amplitude of the RF trapping field, the program provides the calculation of the exact fundamental secular frequency for each integer mass ion which may be stored in the trap. The waveform is calculated by adding the contribution at each instant of time from the single frequency waveforms required to eject each ion which is not desired. The amplitudes of each component frequency in the waveform are weighted appropriately so that all undesired masses and only those undesired masses are ejected during the same time period as the amplitude of the composite waveform is increased. The weighting function is made to be proportional to the inverse first power of the ion mass such that the ratio of $$\frac{\text{Amplitude for ion } i}{\text{Amplitude for ion } n} = \frac{(\text{mass of ion } n/\text{charge of ion } n)^x}{(\text{mass of ion } i/\text{charge of ion } i)^x}$$

Where $1.5 \geqq x \geqq 0.5$

We have generally obtained the most sensitive ion collection when the amplitudes of the secular frequencies are determined according to the value of the exponent $x=1$. However, in our experiments we obtained some improvement over the prior art sensitivity for the entire range $1.5 \geqq x \geqq 0.5$.

Compensations are made in the program to correct for non-uniformity of the frequency response of the amplifiers and other electronics.

Furthermore, because the width of the resonant power absorption of an ion in our QIT is about 1000 Hz, we have found it to be beneficial in storage and sensitivity to provide another compensation. Specifically, our program will also reduce the amplitude of those frequency components used to eject masses which are very close to masses which are to be retained. If the secular frequency of an undersired ion is within, for example, 2000 Hz of the secular frequency of a desired ion, our algorithm will selectively reduce the calculated amplitude of the ion to be ejected by 50 to 99%.

In order to increase the speed of the above described calculations, my program does not calculate a contribution for a mass if it differs in frequency by less than an arbitary amount, i.e. 200 Hz. This arbitary frequency difference is selectable.

The selected phase of the frequency components is not critical because they are not integer multiples and do not tend to come into phase. We can use a random number generator to select the phase, but we also used a fixed phase angle addition relative to the phase of the previous added component.

FIG. 5 is a flow chart for the algorithm used to determine the composite waveform for RF Generator I. The operator enters the mass or mass ranges to store, and in step 101 the program sets flags for each mass to eject. Next, at functions 102, the program calculates the secular frequencies for all stable ions up to the maximum mass. In step 103, the amplitudes $A_m$ for the frequencies to eject the unwanted ions is calculated according to the inverse mass relationship. In step 104, the program scales the previously calculated amplitudes of those frequencies that are within 1.5 KHz of the secular frequency of masses to be stored. After the above, the amplitudes are corrected for frequency response errors in the hardware. The above portion of the algorithm addresses the computation of the amplitudes of the ejected frequencies. The next portion of the program is concerned with the creation of the composite time domain waveform to be applied to the end caps by RF Generator I during the ejection interval. We accumulate the instantaneous value of each of the ejection frequencies, with shifted phase, for 4000 points over a two millisecond time interval. There is a memory array for storing the accumulated amplitude of the composite waveform for each increment of time, $T_i$ for $i=1,2 \ldots 4000$. In step 106, we zero all of the memory array.

Next, in step 107, the mass counter is set equal to the lowest stable mass and the program enters the loop to calculate the amplitude for each time index step i, for i from 1 to 4000. The decision block 109 determines if the mass m is to be ejected, and block 115 determines whether the frequency for masses to be ejected are displaced from the last m calculated by more than a selected amount D. If so, then the program adds the contribution from the corresponding secular frequency to the previously computed $T_i$ for each time index step i and stores it for each value of i in the array. This is represented by the notation:

$$T_i = T_i + A_m \sin(ikW_m + p)$$

where $k=5\times10^{-7}$, $W_m$ is in rad/sec and p=phase angle. During this calculation the phase angle p is constant for each frequency $W_m$ and is incremented by $\pi/2$ for the next mass. The mass register 112 is then incremented to the next mass value; and so long as the maximum mass is not exceeded at decision block 113, the loop is re-entered via a jump 114 back to step 109.

There is another advantage which occurs by use of the above noted technique. In normal operation of the QIT, it is the practice to energize the ion multiplier at full operating potential as soon as the ramping voltage 34 commences. Because the normal storage trapping voltage is low, i.e. stores all ions above $m/z=20$, in the typical scan segment, the multiplier received a large burst of $m/z=28$, 32 air ions which are over 100 times more intense than the largest peak in the desired mass spectrum. This results in degradation and shortened like of the ion multiplier. Elimination of these ions prior to excitation of the electron multiplier eliminates this source of problems.

When it is desired to isolate a single mass m(p) of ion within the QIT, as for example in the first step of an MS/MS experiment, the above described procedure for selectively trapping ions may not have sufficient resolution at higher masses. Because the initial isolation occurs at low storage RF amplitude for best trapping efficiency, the secular frequencies of m(p) and m(p)+1 may differ by less than 70 Hz. As described above, the resonant ejection occurs in our trap over a range of about 1000 Hz, so that it is not possible at higher masses to efficiently store ions at a single mass m(p) while completely rejecting ions of mass m(p)±1. In order to achieve complete isolation of a single mass ion, the procedure described above needs to be modified. A narrow mass range including m(p) is selectively stored until the trap is completely filled to capacity, using the method already described. Then, the RF storage level is raised to a value which corresponds to $q_z$ of 0.7 or greater, and a waveform containing frequency components at or near the secular frequencies of each of the ions in the narrow mass range to be ejected is applied for a time sufficient to cause the ejection of all ions with masses different from m(p). At the high value of $q_z$ the secular frequency of m(p)+1 will differ from that of m(p) by an amount comparable to the linewidth, and efficient isolation of m(p) is possible.

The invention herein has been described in respect to specific figures. It is not my intention to limit my invention to any specific embodiment, and the scope of the invention should be determined by my claims. With this in view,

What is claimed is:

1. In a method for selectively trapping and isolating a selected ion or range of ions in a quadrupole ion trap (QIT) system, said QIT system having a ring electrode, a pair of end caps, an RF trapping voltage source having a trapping frequency F, a first supplemental RF waveform connected to said end caps, and a second supplementary RF waveform connected to said end caps, and means for introducing a sample into said QIT, said method for isolating including the steps of:

a. establishing said RF trapping voltage at a first value to enable retention of a large mass range of ions in said ion trap, said value sufficiently low to correspond to the best trapping efficiency;

b. forming ions or injecting ions of a sample in said QIT;

c. applying said first supplementary RF waveform to said end caps to resonantly reject selected ions;

d. resetting said RF trapping voltage to a second value, said second value corresponding to a value of $q_z$ of at least 0.7 wherein $q_z$ is proportional to said RF trapping voltage and inversely proportional to the mass of said ions;

e. applying said second supplementary RF waveform to said end caps to resonantly reject selected ions;

f. simultaneously carrying out steps (b) and (c),. wherein the waveform of said first supplementary RF waveform is a composite of the secular frequencies corresponding to the ions from the constituents of the residual gases in said QIT, obtaining said composite by adding together at selected points in time, the amplitude of each said secular frequency waveform.

2. The method of claim 1 wherein said residual gases also include air gases which are in said QIT during the ionization step which will become ionized, the ions of which are retained in said trap in large enough numbers to increase the space charge in said QIT so as to inhibit efficient collection of the heavier ions in said trap.

3. In a method for selectively trapping and isolating a selected ion or range of ions employing a quadrupole ion trap (QIT) system, said QIT system having a ring electrode, a pair of end caps, an RF trapping voltage source having trapping frequency F, a first supplementary RF waveform connected to said end caps, and a second supplementary RF waveform connected to said end caps, said method for selective trapping and isolating ions including:

a. establishing said RF trapping voltage at a first value to enable retention of a mass range of ions in said ion trap, said value sufficiently low to correspond to the best trapping efficiency;

b. providing ions of a sample in said QIT;

c. applying said first supplementary RF waveform to said end caps to resonantly reject selected undesired ions, wherein said RF waveform contains a plurality of frequencies;

d. resetting said RF trapping voltage to a second value, said second value corresponding to a value of $q_z$ of at least 0.7 wherein $q_z$ is proportional to said RF trapping voltage and inversely proportional to the mass of said ions;

e. applying a fixed frequency with the second supplementary waveform, f. simultaneously carrying out steps (b) and (c) and then simultaneously carrying out steps (d) and (e) wherein the waveform of said first supplementary waveform in step (b) and (c) is a composite of the secular frequencies corresponding to the m/z for the ions which are to be ejected during the trapping, obtaining said composite by adding together, at selected points in time, the instantaneous voltage of each said secular frequency for each said ion, wherein the amplitudes $A_i$ and $A_n$ of the said secular frequencies for first ions of mass $m_i$ and charge $z_i$ are related to ions of mass $m_n$ and charge $z_n$ such that $$\frac{A_n}{A_i} = \left(\frac{m_i z_i}{m_n z_n}\right)^x$$

where $0.5 \leqq x \leqq 1.5$.

4. The method of claim 3 wherein said composite is corrected for non-uniform frequency response in the electronic circuits.

5. The method of claim 3 wherein said composite only includes contributions for ions if their corresponding secular frequency differs by more than an arbitrarily selectable amount.

6. The method of claim 5 wherein the relative phase of the said secular frequencies are selected so that two adjacent frequencies do not have the same phase.

7. The method of claim 5 wherein said relative phase of the said secular adjacent frequencies are rotated 90° relative to one another.

8. The method of claim 6 wherein said relative phase of the said secular frequencies are determined by a random number generator.

9. In a method for isolating a single selected ion having a mass m(p) employing a quadrupole ion trap (QIT) system, said QIT system having a ring electrode, a pair of end caps, means for introducing a sample, an RF trapping voltage source having a trapping frequency F connected to said ring electrode, a first supplementary waveform connected to said end caps, and a second supplementary waveform connected to said end caps, said method for selectively trapping and isolating a selected parent ion including:

a. establishing said RF trapping voltage at a first value to enable retention of a large mass range of ions in said ion trap, said value sufficiently low to correspond to the best trapping efficiency;

b. forming or injecting ions from a sample in said QIT;

c. applying said first supplementary RF waveform to said end caps to resonantly reject selected ions; The improved method comprising;

(i) simultaneously carrying out steps (b) amd (c); obtaining said first supplementary RF waveform by creating a composite of secular frequencies corresponding to the m/z for the ions which are to be ejected, said composite obtained by adding together, at selected points of time, the instantaneous amplitude, of each said secular frequency for each said ion to be ejected, wherein the amplitudes $A_i$ and $A_n$ of respective said secular frequencies are related such that the ratio of their amplitudes for corresponding secular frequencies are inversely proportional to the m/z ration for the corresponding ions of mass $m_i$ and charge $z_i$ in relation to ions of mass $m_n$ and charge $z_n$ according to the equation, $$\frac{A_i}{A_n} = \frac{(m_n/z_n)^x}{(m_i/z_i)^x}$$

where $0.5 \leqq x \leqq 1.5$, and where n and i are any different ions simultaneously stored in said QIT, (ii) after completing steps (a) through (c), increasing the RF trapping voltage to a value to place said m(p) ion to be isolated at a $q_z > 0.7$ to enable secular frequency for ion m(p)+1 to be approximately 1000 Hz displaced from the secular frequency for ion m(p); and (iii) repeating steps (c) to isolate m(p) in said QIT.

10. The method of claim 9 wherein x=1.0.

11. The method of claim 10 wherein the said composite only includes contributions for ions if their secular frequencies differ by more than a selected amount.

12. The method of claim 11 wherein the composite includes a compensation such that the amplitude $A_i$ and $A_n$ are reduced by a selectable percentage if the secular frequencies corresponding to $ion_i$ and $ion_n$ are within a selectable frequency interval of an ion desired to be stored.

* * * * *